(12) United States Patent
Lee et al.

(10) Patent No.: US 6,617,003 B1
(45) Date of Patent: Sep. 9, 2003

(54) DIRECTLY COOLED THERMAL BARRIER COATING SYSTEM

(75) Inventors: Ching-Pang Lee, Cincinnati, OH (US); Robert Edward Schafrik, Cincinnati, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/707,023

(22) Filed: Nov. 6, 2000

(51) Int. Cl.$^7$ .............................. B32B 15/04; F03B 3/12
(52) U.S. Cl. .................. 428/131; 428/133; 428/134; 428/135; 428/632; 428/650; 428/680; 428/469; 428/699; 428/702; 416/241 R; 416/241 B; 416/97 R; 416/97 A
(58) Field of Search ...................... 428/131, 133, 428/134, 135, 136, 632, 650, 655, 680, 469, 699, 702; 416/241 B, 241 R, 97 R, 97 A

(56) References Cited

U.S. PATENT DOCUMENTS

| | | | |
|---|---|---|---|
| 3,904,789 A | | 9/1975 | Speirs et al. |
| 4,311,433 A | * | 1/1982 | Bratton et al. |
| 4,530,861 A | | 7/1985 | Sippel et al. |
| 4,574,451 A | | 3/1986 | Smashey et al. |
| 4,743,462 A | | 5/1988 | Radzavich et al. |
| 4,978,558 A | | 12/1990 | Lamm |
| 5,034,284 A | | 7/1991 | Bornstein et al. |
| 5,098,257 A | | 3/1992 | Hultgren et al. |
| 5,195,243 A | | 3/1993 | Junod |
| 5,249,357 A | * | 10/1993 | Holmes et al. |
| 5,607,561 A | | 3/1997 | Gruver et al. |
| 5,626,462 A | | 5/1997 | Jackson et al. |
| 5,681,661 A | | 10/1997 | Kelly |
| 5,800,695 A | | 9/1998 | Kang et al. |
| 5,902,647 A | | 5/1999 | Venkataramani et al. |
| 5,985,122 A | | 11/1999 | Conner |
| 6,241,469 B1 | * | 6/2001 | Beeck et al. |
| 6,321,449 B2 | * | 11/2001 | Zhao et al. |
| 6,375,425 B1 | * | 4/2002 | Lee et al. |
| 6,427,327 B1 | * | 8/2002 | Bunker et al. |

* cited by examiner

Primary Examiner—Deborah Jones
Assistant Examiner—Jennifer McNeil
(74) Attorney, Agent, or Firm—David L. Narciso; McNees, Wallace & Nuric

(57) ABSTRACT

An actively cooled TBC bond coat wherein active convection cooling is provided through micro channels inside or adjacent to a bond coat layer applied to a substrate. The micro channels communicate directly with at least one cooling fluid supply contained within a turbine engine component, thereby providing direct and efficient cooling for the bond coat layer. Because the substrate is covered with an actively cooled bond coat layer, it will reduce the cooling requirement for the substrate, thus allowing the engine to run at higher operating temperature without the need for additional cooling air, achieving a better engine performance. In one form, the component includes a substrate having at least one substrate channel with a first and second end. At least one micro channel is in fluid communication with a plenum which in turn is in fluid communication with at least one substrate channel through an exit orifice in the substrate channel which is at a first end of the substrate channel. A second end of the substrate channel is in communication with a cooling fluid supply, for example, cooling circuits contained within the turbine engine component. The micro channel is located between the substrate surface and the outer gas flow path surface of the component.

16 Claims, 3 Drawing Sheets

DIRECTLY COOLED THERMAL BARRIER COATING SYSTEM

CROSS-REFERENCE TO RELATED APPLICATIONS

This application references co-pending applications assigned to the assignee of the present invention, which are identified as 13DV-13528 entitled "Transpiration Cooling in Thermal Barrier Coating" and Attorney Docket No. 13DV-13527 entitled "Multi-layer Thermal Barrier Coating with Integrated Cooling System," the contents of which are incorporated herein by reference.

FIELD OF THE INVENTION

This invention relates generally to gas turbine engines, and in particular, to a cooled flow path surface region.

BACKGROUND OF THE INVENTION

In gas turbine engines, for example, aircraft engines, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures is a well established art, and depends in part on supplying a cooling air to the outer surfaces of the metal parts through various methods. The metal parts of these engines that are particularly subject to high temperatures, and thus require particular attention with respect to cooling, are the metal parts forming combustors and parts located aft of the combustor including turbine blades and vanes and exhaust nozzles.

The hotter the turbine inlet gases, the more efficient is the operation of the jet engine. There is thus an incentive to raise the turbine inlet gas temperature. However, the maximum temperature of the turbine inlet gases is normally limited by the materials used to fabricate the components downstream of the combustors such as the vanes and the blades of the turbine. In current engines, the turbine vanes and blades are made of nickel-based superalloys, and can operate at temperatures of up to 2100°–2200° F.

The metal temperatures can be maintained below melting levels with current cooling techniques by using a combination of improved cooling designs and thermal barrier coatings (TBCs). For example, with regard to the metal blades and vanes employed in aircraft engines, some cooling is achieved through convection by providing passages for flow of cooling air from the compressor internally within the blades so that heat may be removed from the metal structure of the blade by the cooling air. Such blades have intricate serpentine passageways within the structural metal forming the cooling circuits of the blade.

Small internal orifices have also been devised to direct this circulating cooling air directly against certain inner surfaces of the airfoil to obtain cooling of the inner surface by impingement of the cooling air against the surface, a process known as impingement cooling. In addition, an array of small holes extending from a hollow core through the blade shell can provide for bleeding cooling air through the blade shell to the outer surface where a film of such air can protect the blade from direct contact with the hot gases passing through the engines, a process known as film cooling.

In another approach, a thermal barrier coating (TBC) is applied to the turbine blade component, which forms an interface between the metallic component and the hot gases of combustion. The TBC includes a ceramic coating that is applied to the external surface of metal parts to impede the transfer of heat from hot combustion gases to the metal parts, thus insulating the component from the hot combustion gas. This permits the combustion gas to be hotter than would otherwise be possible with the particular material and fabrication process of the component.

TBCs include well-known ceramic materials, for example, yttrium-stabilized zirconia (YSZ). Ceramic TBCs usually do not adhere well directly to the superalloys used as substrate materials. Therefore, an additional metallic layer called a bond coat is placed between the substrate and the TBC. The bond coat may be made of a nickel containing overlay alloy, such as a NiCrAlY or a NiCoCrAlY, or other composition more resistant to environmental damage than the substrate, or alternatively, the bond coat may be a diffusion nickel aluminide or platinum aluminide whose surface oxidizes to a protective aluminum oxide scale that provides improved adherence to the ceramic top coatings. The bond coat and overlying TBC are frequently referred to as a thermal barrier coating system.

While superalloys coated with such thermal barrier coating systems do provide substantially improved performance over uncoated materials, there remains room for improvement. Improved environmental resistance to destructive oxidation and hot corrosion is desirable. In some instances, the alloying elements of the bond coat interdiffuse with the substrate alloy and consume walls of the turbine airfoils, i.e., reduces load carrying capability, thereby limiting blade life. This interdiffusion can also reduce environmental resistance of the coating.

Even with the use of advanced cooling designs and thermal barrier coatings, it is also desirable to decrease the requirement for cooling air, because reducing the demand for cooling air also contributes to improving overall engine operating efficiency. One way to achieve such a reduction is to improve the cooling of the metal parts immediately adjacent to their outer surfaces.

U.S. Pat. No. 5,195,243 to Junod is directed to a method of making a coated porous metal panel. A plurality of metal panels are fastened in such a manner so as to be separated by a plurality of integral, raised pedestals each having a flat bonding surface. An internal chamber is thereby defined, the chamber receiving a flow of cooling air from inlet pores on one metal panel and discharging the cooling air through discharge pores on a second metal panel. The raised pedestals create a tortuous flow path for the cooling air as it passes from the inlet pores through the internal chamber to the discharge pores. A thermally resistant coating is applied to the panel containing the discharge pores, followed by placement of a shield. The placement of the inlet pores, discharge pores and extraction passages (located directly behind the discharge pores) is critical to minimize deposit of surplus coating material in the internal chamber and in the discharge and inlet pores.

U.S. Pat. No. 5,034,284 to Bornstein et al. discloses a porous strain isolation layer placed between the substrate and the bond coat. The porous layer is formed by spraying a mixture of alloy and polymer particles and subsequently heating to eliminate the polymer. The pores are in a random pattern and do not create channels.

Thus, there is an ongoing need for an improved thermal barrier coating system, wherein the environmental resistance and long-term stability of the thermal barrier coating system is improved so that higher engine efficiencies can be obtained. In previous designs, the bond coat temperature limit is critical to the TBC's life and has had an upper limit of about 2100° F. Once the bond coat exceeds this temperature, the coating system will quickly deteriorate, due to high temperature mechanical deformation and accelerated oxidation as well as a more rapid interdiffusion of elements with the substrate alloy. The coating system can separate from the substrate exposing the underlying superalloy component to damage from the hot gasses.

What is needed are improved designs that will allow turbine engine components to run at higher operating temperatures, thus improving engine performance without additional cooling air. The present invention fulfills this need, and further provides related advantages.

SUMMARY OF THE INVENTION

The present invention provides active convection cooling through micro channels within or adjacent to the bond coat layer applied to a turbine engine component, for example, a blade or vane. When placed adjacent to or within a porous TBC, the micro channels additionally provide transpiration cooling through the porous TBC. The micro channels communicate directly with at least one cooling circuit contained within the blade or vane from which they receive cooling air, thereby providing direct and efficient cooling for the bond coat layer. Because the substrate includes an actively cooled flow path surface region that can reduce the cooling requirement for the substrate, the engine can run at a higher firing temperature without the need for additional cooling air, achieving a better, more efficient engine performance.

In one form, the present invention provides for an actively cooled flow path surface region for a gas turbine hot section component comprising at least one channel in the component substrate material having a first and second end. The first end terminates in an exit orifice located at a pre-selected position on a first surface of the substrate material and connected to a plenum, the second end communicating with a cooling fluid supply. At least one micro channel communicates with at least one exit orifice. The micro channel is located at an interface between the first surface of the substrate material and a first surface of a second material, such as a bond coat, and is substantially parallel to the surface of the substrate and substantially perpendicular to the channel in the substrate. Optionally, a ceramic thermal barrier coating (TBC) is layered to the second, opposed surface of the second material.

In another form, the present invention sets forth a method for actively cooling the flow path surface region of an engine component used in a gas turbine engine comprising the steps of masking the surface of the substrate with a masking material, the masking material forming a pattern on the substrate surface overlying at least one cooling fluid supply contained within the component, coating the masked substrate surface with a bond coat; removing the masking material, leaving hollow micro channels in the pattern occupied by the masking material before its removal for the transport of a cooling fluid and passing a cooling fluid through the micro channels.

In still another form, the present invention sets forth a method for actively cooling the flow path surface region of an engine component used in a gas turbine engine comprising the steps of coating a substrate with a bond coat, masking the exposed surface of the bond coat with a masking material to form a pattern on the exposed bond coat surface in communication with at least one cooling fluid supply contained within the engine component, applying a TBC to the masked bond coat, removing the masking material leaving hollow micro channels in the pattern occupied by the masking material before its removal for the transport of a cooling fluid, and optionally passing a cooling fluid through the micro channels.

In still another form, the present invention delineates a method for actively cooling the flow path surface region of an engine component used in a gas turbine engine comprising the steps of coating a substrate with a first bond coat layer, applying a masking material to the exposed surface of the bond coat to form a predetermined pattern on the exposed bond coat surface in communication with at least one cooling fluid supply contained within the engine component, applying a second bond coat layer over the masking material, applying a TBC to the second bond coat layer, removing the masking material, leaving hollow micro channels in the pattern occupied by the masking material before its removal for the transport of a cooling fluid, and optionally passing a cooling fluid through the cooling channels.

In still another form, the present invention delineates a method for actively cooling the flow path surface region of an engine component used in a gas turbine engine comprising the steps of coating a substrate with a bond coat layer, applying a first TBC layer to the bond coat, applying a masking material to the exposed surface of the first TBC layer to form a predetermined pattern in communication with at least one cooling fluid supply contained within the engine component, applying a second, porous TBC layer over the masking material, removing the masking material, leaving hollow micro channels for the transport of a cooling fluid in the pattern occupied by the masking material before its removal, and optionally passing a cooling fluid through the micro channels.

In still another form, the present invention sets forth a method for actively cooling the flow path surface region of an engine component used in a gas turbine engine comprising the steps of grooving a surface of a substrate such that at least one micro groove communicates with at least one cooling fluid supply contained within the engine component, placing a masking material within the micro grooves, placing a bond coat on the grooved substrate, applying a TBC layer over the bond coat, removing the masking material leaving hollow micro channels for the transport of a cooling fluid, and, optionally passing a cooling fluid through the micro channels.

The present invention further comprises the cooled flow path surface region formed by the foregoing methods and the turbine component with the patterned micro channels substantially parallel to the surface of the substrate for cooling the component.

An advantage of the present invention is the flow path surface region of the coated gas turbine component is actively cooled. By removing heat from this region, the integrity of the bond coat can be maintained at higher engine operating temperatures.

In one embodiment, the active convection cooling through the micro channels occurs within or adjacent to the bond coat layer, providing direct and efficient cooling for the bond coat layer. Since the substrate is covered with the bond coat layer, the cooling requirement for the substrate will also be reduced.

Another advantage of the present invention is that the actively cooled bond coat layer will allow engine components to run at higher operating temperatures to achieve a better engine performance.

Other features and advantages of the present invention will be apparent from the following more detailed description of the preferred embodiment, taken in conjunction with the accompanying figures which illustrate, by way of example, the principles of the invention.

DETAILED DESCRIPTION OF THE PREFERRED EMBODIMENTS

In addition to methods for actively cooling the flow path surface region of a coated gas turbine component, the present invention sets forth the processes of producing active micro channels which can be used for cooling hot spots on any hot section components, such as turbine blades, turbine vanes, nozzles, combustors and the like.

The following embodiments of the present invention vary in the location of the active micro channels. Exemplar channel dimensions, orifice sizes, bond coat thickness and TBC thickness remain consistent between the various embodiments or can be varied and optimized for the various embodiments; therefore, in the interest of brevity and clarity, they will not be repeated. It is to be understood that these dimensions and sizes are only exemplar and will vary with the size of the substrate and the cooling requirements to allow active flow of cooling fluid.

The TBC layer is generally a porous TBC layer and is the subject of a co-pending application assigned to the assignee of the present invention, which is identified as 13DV-13528 and titled "Integrated Cooling in Thermal Barrier Coating.

Figure 1:
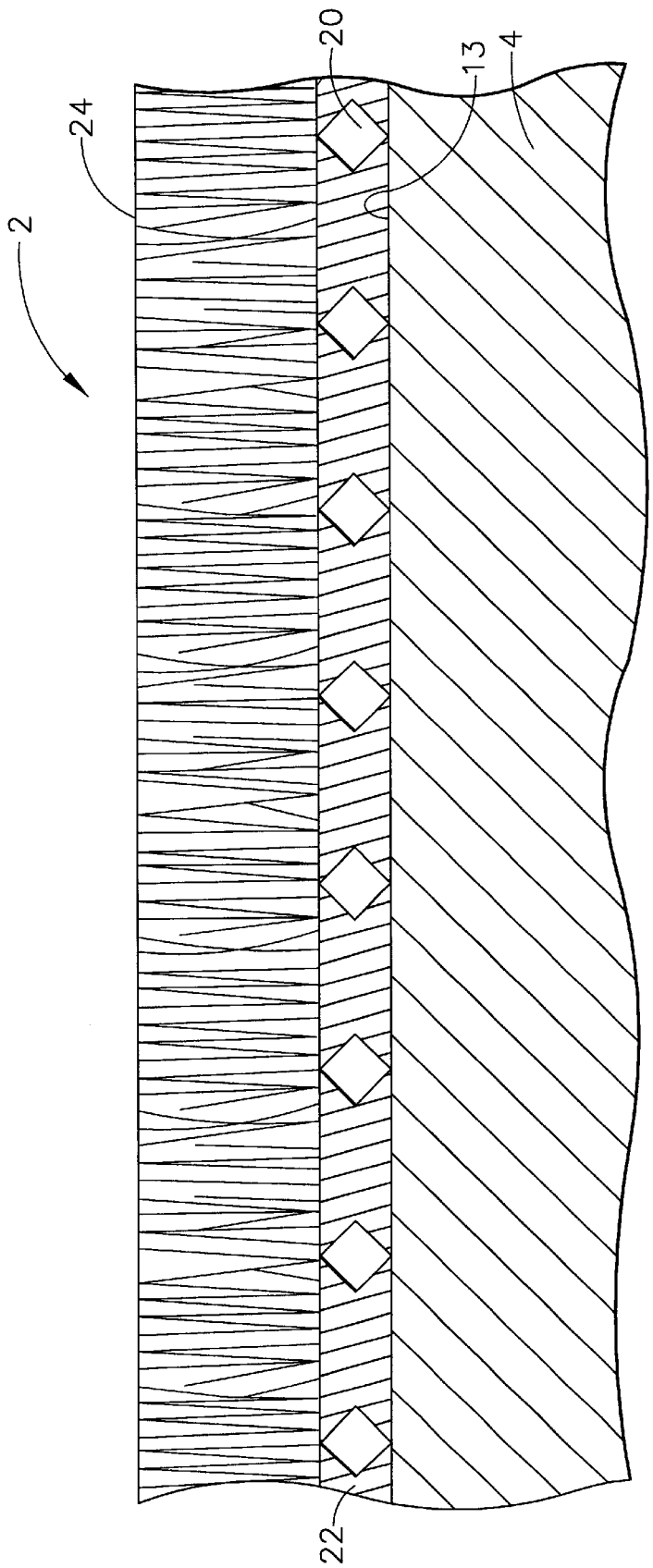
FIG. 1 is a cross section view showing the cooling channels at the substrate/bond coat interface.

Referring now to the Figures, where like parts have the same numbers, in accordance with a preferred embodiment of the invention, there is shown in FIG. 1 the substrate 4 of for example, a jet engine turbine blade 2. Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, René 80, René 41, René 125, René 77, René N4, René N5, René N6, $4^{th}$ generation single crystal superalloy—MX-4, Hastelloy X, and cobalt-based HS-188.

Figure 3:
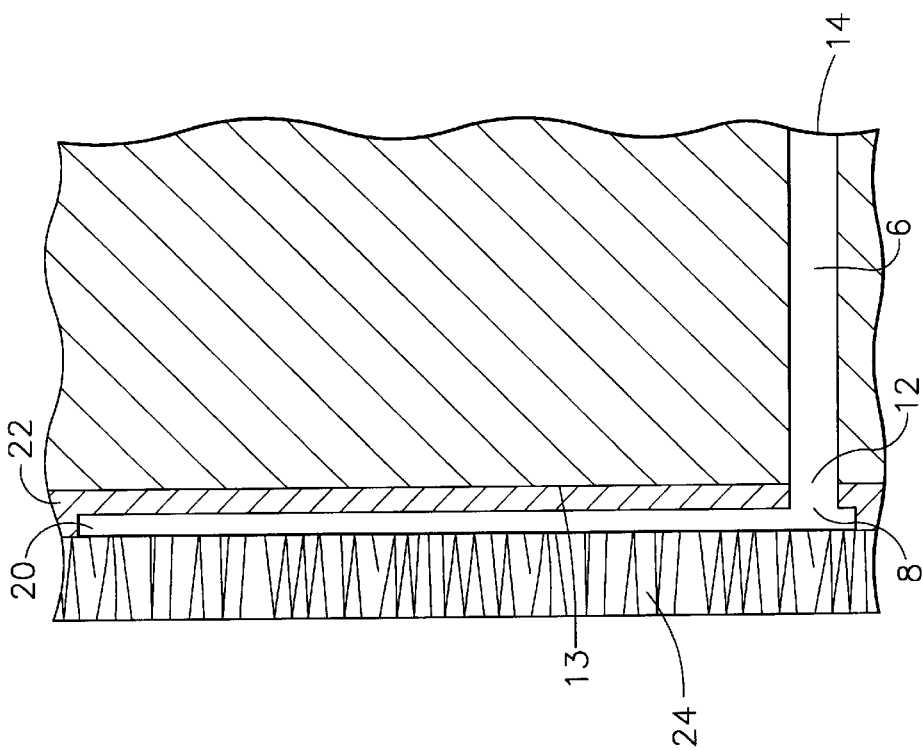
FIG. 3 is a side view of the cooling fluid supply.

Contained within the substrate 4 is at least one channel 6 (FIGS. 2 and 3) for the passage of cooling fluid. A first substrate channel end 12 terminates at an exit orifice 8 on the surface 13 of the substrate 4, and communicates via a plenum 16, to the micro channel 20. A second end 14 of channel 6 connects to the cooling circuits fabricated into a turbine engine component. Each exit orifice 8, in cross section, may be larger than the size of the micro channels to which it is connected. The actual size depends on the cooling requirements of the article. For the turbine blade depicted in FIG. 1, 2 and 3, the micro channels are oriented roughly parallel to the substrate surface.

Masking material is deposited on the substrate surface such that the masking material covers at least one exit orifice 8 and forms a template for a cooling channel or micro channel 20 in a predetermined pattern. In cross section, the shape of the masking material may be in the form of, for example, a rectangle, a circle, a triangle or any other shape that will allow cooling fluid to flow. The micro channels will have the predetermined pattern, shape, and size of the masking material. In cross section, the masking material and, hence, the micro channel 20 is about 0.0005 to about 0.02 inch in diameter, preferably about 0.001 inch by about 0.01 inch square. The template and, hence, the micro channels 20 may be serpentine or they may intersect each other to form a cooling mesh.

The masking material is deposited by any suitable method consistent with application of the material to a superalloy substrate. The masking material must be capable of being able to accept a bond coat without deteriorating. After application of the bond coat, the masking material must be capable of being removed from the substrate. This can be accomplished by vaporizing, i.e., converting the masking material to a gas, by liquefying, by dissolving the masking material in a solution that does not affect the substrate or by a chemical reaction with a flowing chemical mixture which does not attack the substrate.

The micro channel 20 masking material for example, may be laid down directly on the substrate in a serpentine or mesh pattern, or a pre-formed masking material mesh or serpentine pattern may be placed onto the substrate and held in place using an appropriate adhesive. Bond coats such as MCrAl(X)s are applied by physical vapor deposition (PVD) processes such as electron beam evaporation (EB), ion-plasma arc evaporation, sputtering, or plasma spray processes such as air plasma spray (APS), high velocity oxy-fuel (HVOF) or low pressure plasma spray (LPPS) and temperatures can be 1800° F. or higher. PVD processes are applied in a vacuum and thermal sprays can be controlled so as to be applied under non-oxidizing conditions. Thus, some suitable masking materials include salts that can be removed with a liquid in which the salt is soluble, or carbon based materials and binders that can be vaporized under oxidizing conditions at elevated temperatures.

Once the masking material has been placed, a bond coat 22 is then applied using known techniques to a thickness of about 0.0005 inch to about 0.05 inch, preferably about 0.002 inch in thickness. The thickness must be sufficient so that a micro channel remains after the masking material is removed. For example, the bond coat 22 may be a diffusion aluminide, such NiAl or PtAl base alloy applied to the appropriate thickness by for example, vapor phase aluminiding or chemical vapor deposition (CVD), or it may be a MCrAl(X) where M is an element selected from the group consisting of Fe, Co and Ni and combinations thereof and (X) is an element selected from the group of gamma prime formers, solid solution strengtheners, consisting of, for example, Ta, Re and reactive elements, such as Y, Zr, Hf, Si, and grain boundary strengtheners consisting of B, C and combinations thereof, in which deposition is by PVD or thermal spray.

After the bond coat 22 has been deposited, the masking material is completely removed, thereby leaving micro channels 20 formed in the volume previously occupied by the now removed masking material at the interface of the bond coat 22 and the surface of the substrate. At least one micro channel 20 is in communication with a plenum 16 communicating with at least one channel 6 in substrate 4 through an exit orifice 8 in channel 6 which is at a first end 12 of the channel 6. A second end 14 of the channel 6 in substrate 4 is in communication with a cooling fluid supply, for example, cooling circuits contained within the turbine engine component. A TBC 24 may then be applied over the bond coat using known techniques to a thickness in the range of from about 0.001 inch to about 0.05 inch, preferably about 0.005 inch thickness.

Figure 2:
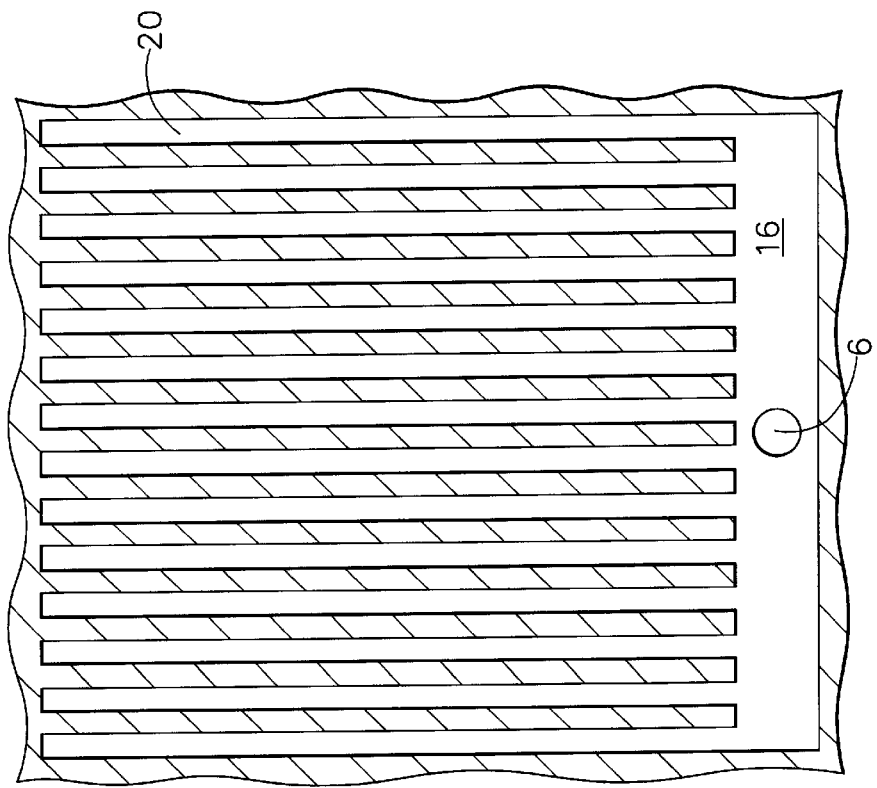
FIG. 2 is a front view of the cooling fluid supply.

Cooling fluid is thereby routed from an engine cooling fluid supply through channels 6 to the plenum 16 and into at least one micro channel 20 as shown in FIG. 2. After passage through the micro channel 20, the cooling fluid which is at an elevated temperature, is expelled, typically into the gas stream. In this manner, the bond coat 22 is kept at a reduced temperature through active convection cooling.

Figure 4:
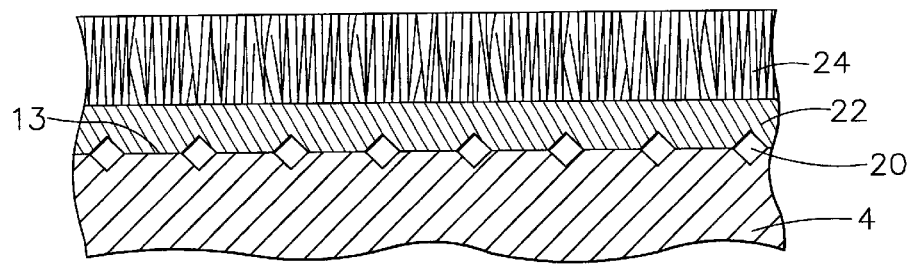
FIG. 4 is a cross section view showing the cooling channels partially contained within the substrate.

In another embodiment of the present invention, as shown in FIG. 4, micro grooves in the form of, for example, a mesh pattern or serpentine rows are partially machined for example, by a laser, by an electrochemical machining technique (ECM), cast during manufacture, or etched into the surface of a turbine component substrate, for example, a jet engine turbine blade. The cross section of the micro grooves may assume any geometric form, for example, a rectangle, a circle, a triangle or any other shape that will facilitate the flow of cooling fluid. In order to complete the micro channels, the partially completed micro grooves are then filled with any masking material that may be completely removed without leaving any residue, as described above. At least one micro groove is in communication with a plenum 16 and to at least one channel 6 in substrate 4 through an exit orifice 8 in channel 6 which is at a first end of the channel 6. A second end 14 of the channel 6 in substrate 4 is in communication with cooling fluid supply, providing cooling fluid to the turbine engine component.

A bond coat 22, for example a MCrAl(X), or alternatively aluminum which then forms a diffusion aluminide coat that serves as a bond coat 22, is placed using known techniques over the substrate and masking material. The masking material is then removed, for example, by vaporization or liquification, thereby leaving micro channels 20 at the interface between the bond coat 22 and the substrate 4 as previously discussed. The dimensions of the micro channel 20, in cross section, is about 0.001 to about 0.02 inch in diameter, when circular, and may be arcuate or may assume other geometric forms having equivalent dimensions, that is, yielding an equivalent cross section size. Although depicted as a diamond in FIG. 4, a cross section of the micro channels may take any preselected form such as a parallelogram, rectangle, an oval, a triangle or a circle. In the most preferred embodiment, the micro channel is about 0.002 inch by about 0.002 inch square. As described above, the bond coat 22 is therefore kept at a reduced temperature through active convection cooling by fluid passing through the cooling channels. A TBC 24 layer is then placed over the bond coat containing the micro channels 20 using known techniques.

Alternatively, a bond coat 22 may be applied to the substrate 4 containing the micro grooves 20 prior to application of the masking material into the micro grooves 20. A fluid communication is maintained to plenum 16 via exit orifice 8 and channel 6. If necessary, at least one hole is machined for example, using a laser, through the first layer of bond coat 22 to communicate with a plenum 16 and to an exit orifice 8 which is in communication with a first end 12 of a channel 6 within the substrate 4. A second application of bond coat 22 is then be made over the first application of bond coat 22 so that the masking material is encased within the bond coat 22. After removal of the masking material, the micro channels 20 lie within the bond coat 22.

Figure 5:
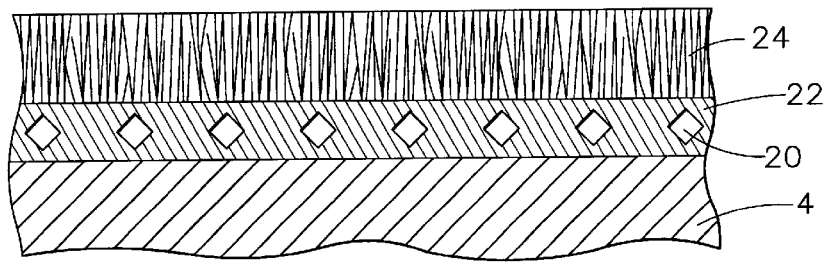
FIG. 5 is a cross section view showing the cooling channels contained within the bond coat.

Referring to FIG. 5, in still another embodiment of the present invention, a first layer of bond coat 22 is applied to a relatively smooth substrate 4, for example, a jet turbine engine blade using known techniques. If necessary, at least one hole is machined for example, using a laser, through the first layer of bond coat 22 so that there is fluid communication among a plenum 16, an exit orifice 8 and a first end 12 of a channel 6 within the substrate 4 as previously set forth. The second end 14 of the channel 6 is in communication with the cooling fluid supply for the component. In this embodiment, a masking material is then placed as described above on the first layer of bond coat 22 and covered with a second layer of bond coat 22 using known techniques. The masking material is then removed as described above, leaving micro channels 20 wholly contained within the bond coat 22. A layer of TBC 24 is then applied, using known techniques, to the bond coat 22. As described above, the bond coat 22 is therefore kept at reduced temperature through active convection cooling through micro channels.

Figure 6:
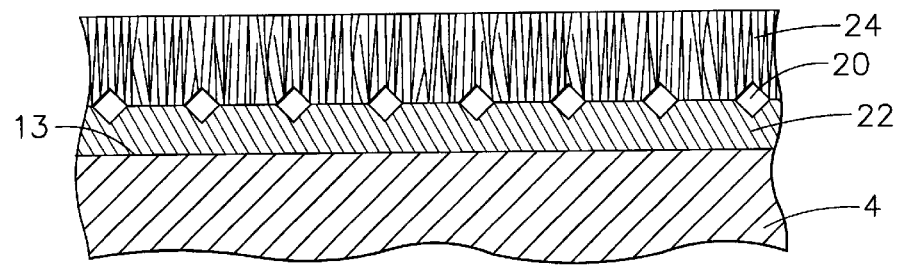
FIG. 6 is a cross section view showing the cooling channels at the bond coat/TBC interface.

In yet another embodiment of the present invention, as shown in FIG. 6, a bond coat 22 is applied to the substrate using known techniques. If necessary, at least one hole is machined, for example, using a laser, through the bond coat 22 to provide fluid communication with a plenum 16 and an exit orifice 8 which is in communication with a first end 12 of a substrate channel 6. The second end 14 of the substrate channel 6 is in communication with a cooling fluid supply for the turbine engine component. A masking material is then placed as described above on the bond coat 22 and covered with a TBC 24 layer using known techniques. The masking material is then removed as described above, leaving micro channels 20 at the interface between the bond coat 22 and TBC 24. The TBC layer 24 is a porous TBC layer as described in the above referenced co-pending application. The micro channels 20 at the interface of the bond coat 22 and TBC 24 allow for both convection cooling as described above and transpiration cooling through the porous TBC layer 24 as described in the above referenced co-pending application.

Figure 7:
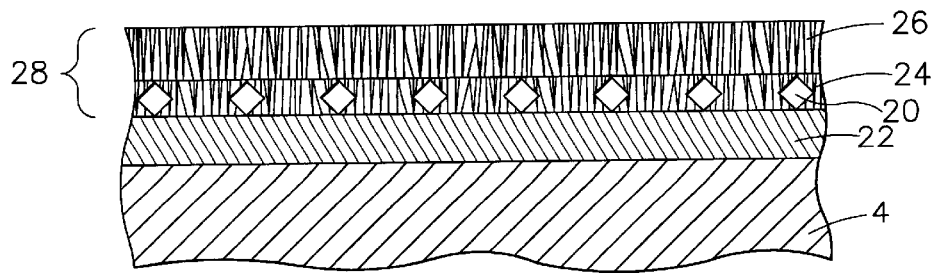
FIG. 7 is a cross section view showing the cooling channels contained within the TBC.

In yet another embodiment of the present invention, shown in FIG. 7, a bond coat 22 and a first TBC layer 24 is applied to the substrate 4 using known techniques. At least one hole is machined for example, using a laser, at the interface through the first TBC layer 24 and bond coat 22 to allow fluid communication with a plenum 16 and an exit orifice 8 of a channel 6 within substrate 4. The second end 14 of the channel 6 is in communication with a cooling fluid supply for the turbine engine component. A masking material is then placed as described above on the first TBC layer 24 and covered with a second TBC 26 using known techniques. The masking material is removed as described above, leaving micro channels 20 wholly contained within the TBC 28 comprised of the first TBC layer 24 and the second TBC layer 26. The wholly contained micro channels 20 within TBC 28 allow for both convection cooling as described above and transpiration cooling as cooling fluid is forced through TBC layer 26 as described in the above referenced co-pending application.

The present invention also comprises the actively cooled thermal barrier coating system formed by the above described methods.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A cooling system for actively cooling a flow path surface region of a gas turbine hot section component extending into the gas flow path of a gas turbine, comprising:

a substrate having a first surface adjacent the gas flow path;

at least one coating material overlying the first surface of the substrate, the outer portion of the coating material forming the gas flow path surface;

at least one channel in the substrate, the substrate channel extending through the substrate between a first and second end, the first end of the substrate channel terminating in proximity to the first surface of the substrate adjacent to the flow path surface, the second end of the substrate channel in fluid communication with a cooling fluid supply; and at least one micro channel having a cross section of predetermined size and configuration in fluid communication with the first end of the substrate channel, the micro channel positioned between the first surface of the substrate and the outer surface of the coating material, the micro channel extending substantially parallel to the first surface of the substrate for a predetermined length; and means for expelling cooling fluid from the micro channel.

2. The cooling system of claim 1 wherein the at least one coating material includes a bond coat applied over the substrate and a ceramic thermal barrier coating over the bond coat.

3. The cooling system of claim 2 wherein the bond coat is selected from the group consisting essentially of a diffusion aluminide bond coat and an MCrAl(X) bond coat, where M is an element selected from the group consisting essentially of nickel, cobalt, iron and combinations thereof, and X is an element selected from the group consisting essentially of gamma prime formers, solid solution strengtheners, reactive elements, grain boundary strengtheners and combinations thereof.

4. The cooling system of claim 3 wherein X is an element selected from the group consisting of Zr, Hf, Y and rare earth elements.

5. The cooling system of claim 2 wherein the at least one micro channel is located at the interface between the bond coat and the ceramic thermal barrier coating.

6. If The cooling system of claim 2 wherein the at least one micro channel is located within the ceramic thermal barrier coating.

7. The cooling system of claim 1 further including a plenum positioned between the first end of the substrate channel and the at least one micro channel, the plenum in fluid communication with the first end of the substrate channel and the micro channel.

8. The cooling system of claim 1 wherein the first surface of the substrate includes microgrooves fabricated into the first surface of the substrate.

9. The cooling system of claim 1 wherein the configuration of the at least one micro channel is selected from the group of cross sections consisting of triangular, rectangular, oval, arcuate, circular and square.

10. The cooling system of claim 9 wherein the cross sectional area of the at least one micro channel is based on a diameter of about 0.0005" to 0.02" and the configuration is circular.

11. The cooling system of claim 9 wherein the cross sectional area of the at least one micro channel is based on a diameter of about 0.001" to 0.01" and the configuration is circular.

12. The cooling system of claim 1 wherein the micro channel is about 0.002 by about 0.002 inch square.

13. The cooling system of claim 1 wherein the at least one micro channel extending substantially parallel to the first surface of the substrate extends substantially parallel in a serpentine pattern.

14. The cooling system of claim 13 wherein the at least one micro channel is located within the coating material.

15. The cooling system of claim 1 wherein the at least one micro channel extending substantially parallel to the first surface of the substrate extends substantially parallel in a mesh pattern.

16. The cooling system of claim 1 wherein the at least one micro channel is located at the interface between the first surface of the substrate and the at least one coating material.

* * * * *